United States Patent
Boehmer et al.

(10) Patent No.: US 7,365,034 B2
(45) Date of Patent: Apr. 29, 2008

(54) LATENT CARBON DIOXIDE GENERATING MATERIAL

(75) Inventors: Brian E. Boehmer, Cordova, TN (US); Joshua D. Crews, Arlington, TN (US); John P. Erspamer, Lakeland, TN (US)

(73) Assignee: BKI Holding Corporation, Wilmington, DE (US)

( * ) Notice: Subject to any disclaimer, the term of this patent is extended or adjusted under 35 U.S.C. 154(b) by 0 days.

(21) Appl. No.: 10/595,268

(22) PCT Filed: Oct. 7, 2004

(86) PCT No.: PCT/US2004/033540

§ 371 (c)(1),
(2), (4) Date: Jul. 31, 2006

(87) PCT Pub. No.: WO2005/034641

PCT Pub. Date: Apr. 21, 2005

(65) Prior Publication Data
US 2007/0082570 A1 Apr. 12, 2007

Related U.S. Application Data

(60) Provisional application No. 60/509,820, filed on Oct. 8, 2003.

(51) Int. Cl.
B32B 5/24 (2006.01)
B32B 9/00 (2006.01)
B32B 27/04 (2006.01)
D04H 3/00 (2006.01)
C06B 29/00 (2006.01)

(52) U.S. Cl. .................. 442/373; 442/361; 428/470; 428/471; 428/300.7; 428/332; 149/75

(58) Field of Classification Search ............... 442/361, 442/373, 374; 428/296.7, 297.1, 300.4, 300.7, 428/332, 411.1, 470, 471
See application file for complete search history.

(56) References Cited

U.S. PATENT DOCUMENTS 5,246,772 A * 9/1993 Manning .................... 442/364
2003/0089443 A1* 5/2003 Ouederni et al. .......... 156/62.2

* cited by examiner

Primary Examiner—Lynda Salvatore
(74) Attorney, Agent, or Firm—Baker Botts LLP

(57) ABSTRACT

The present invention is directed to nonwoven materials containing a chemical composition capable of generating carbon dioxide when activated. The present invention provides a latent carbon dioxide gas generating material having a first layer containing fiber and a binder, having a basis weight of from about 25 gsm to about 100 gsm and having inner and outer surfaces, a second layer containing a carbon dioxide gas generating composition, having a basis weight of from about 5 gsm to about 300 gsm and having upper and lower surfaces, and a third layer containing fiber and a binder, having a basis weight of from about 25 gsm to about 100 gsm and having inner and outer surfaces. The inner surface of the first layer is in contact with the upper surface of the second layer, and the inner surface of the third layer is in contact with the lower surface of the second layer.

48 Claims, 1 Drawing Sheet

LATENT CARBON DIOXIDE GENERATING MATERIAL

This application claims priority under 35 U.S.C. §119(e) to U.S. Provisional Application Ser. No. 60/509,820, filed Oct. 8, 2003, which is incorporated by reference herein in its entirety.

FIELD OF THE INVENTION

This invention relates to nonwoven materials containing a chemical composition capable of generating carbon dioxide when activated.

BACKGROUND OF THE INVENTION

It is known in the state of the art that the freshness of fruits and vegetables and other perishable food and agricultural materials can be preserved by the use of an environment rich in carbon dioxide. U.S. Pat. No. 5,489,399, hereby incorporated herein by reference in its entirety, discloses various materials useful in carbon dioxide gas generating compositions. This disclosure teaches that the carbon dioxide gas generating composition is usually packed into a bag made of nonwoven fabric, woven fabric, film formed with fine pores not passing a liquid therethrough or composite sheet of such materials and then placed in a package with fruit or vegetables. The disclosure teaches that either the alkali carbonate or the acid of the composition must be of low solubility, since if both are highly soluble the composition itself became liquid.

SUMMARY OF THE INVENTION

It would be advantageous to have a delivery system for carbon dioxide gas generating compositions without the disadvantages of the prior art systems.

This invention provides a nonwoven carrier for carbon dioxide gas generating compositions which is a latent carbon dioxide gas generating material capable of activation under conditions of use so that a local environment rich in carbon dioxide may be established. As opposed to the prior art where all or most of the gas generating composition for a given container of produce is placed in a single location within the container, this invention provides a distribution of the particles or powder of the carbon dioxide gas generating composition throughout a substantial portion of the nonwoven carrier, which may then be installed in the container in any manner desired. Regardless of how the material is placed in a container, horizontal, vertical or otherwise, most of the powder is retained within the nonwoven carrier. The gas generating composition is activated by the absorption of water, which facilitates the chemical reaction of the acid and the base to produce carbon dioxide.

The prior art issue of the gas generating composition itself becoming liquid, either before, during or after reaction to form carbon dioxide, is obviated by distribution of the composition throughout a substantial portion of the nonwoven structure, which is produced from absorbent material which will absorb and retain any liquefied aspect of the composition within the material.

This invention provides a latent carbon dioxide gas generating material comprising:

(A) layer 1 containing fiber and a binder, having a basis weight of from about 25 gsm to about 100 gsm and having inner and outer surfaces, (B) layer 2 containing a carbon dioxide gas generating composition, having a basis weight of from about 5 gsm to about 300 gsm and having upper and lower surfaces, and (C) layer 3 containing fiber and a binder, having a basis weight of from about 25 gsm to about 100 gsm and having inner and outer surfaces, where the inner surface of layer 1 is in contact with the upper surface of layer 2 and the inner surface of layer 3 is in contact with the lower surface of layer 2.

DETAILED DESCRIPTION OF THE PREFERRED EMBODIMENTS

Figure 1:
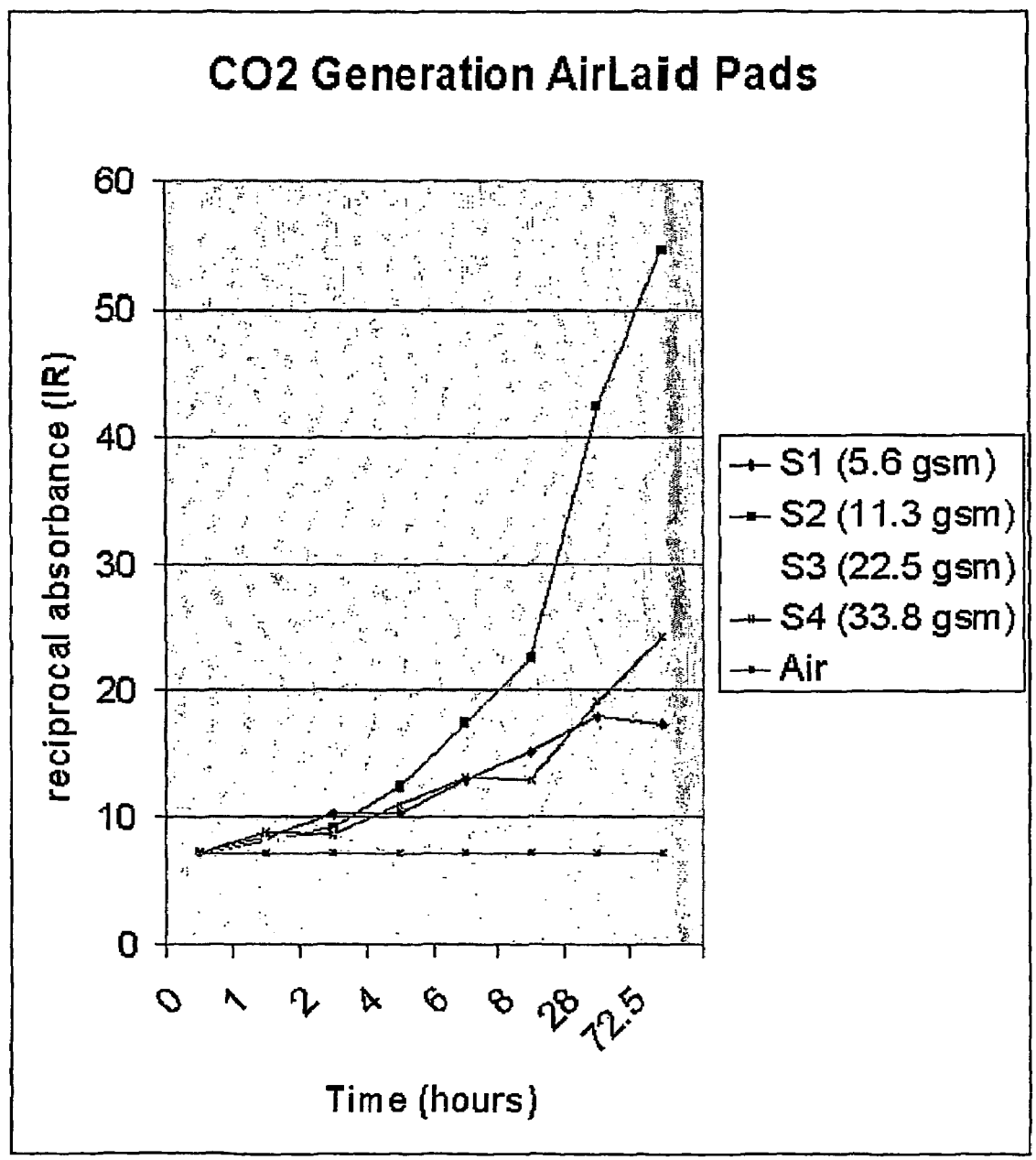
FIG. 1 shows plots of the generation of carbon dioxide measured by IR as a function of time for material having basis weights for the carbon dioxide gas generating composition of 5.6 gsm from Example 1, 11.3 gsm from Example 2, 22.5 gsm from Example 3 and 33.8 gsm from Example 4.

The latent carbon dioxide gas generating material of this invention comprises three layers, layers 1 and 3 containing fiber and binder which are above and below layer 2 which contains the carbon dioxide gas generating composition along with fiber and binder if desired. During early stages of manufacture, the gas generating composition, which may be powder, particulate or granular in form, has considerable freedom to move or migrate within layer 2 and to some extent into layer 1 and or layer 3, becoming intermingled with and dispersed within the fibrous structure. This movement may be slowed, directed or stopped altogether by the appropriate use and activation of binders in the material. While it is desirable for the gas generating composition to be distributed within the fibrous structure, it should not contribute to a dusting problem in the finished product, and it should be relatively if not totally immobile in the finished product. Thus, the finished material can be used in a wide variety of ways.

Layer 1 and layer 3 may be identical, similar or quite different in composition and properties. These layers have inner and outer surfaces, with the inner surface of each layer being in contact with one of the surfaces of layer 3. In the case where layer 2 is simply the gas generating composition with little or no fiber and binder, the particles of the gas generating composition may migrate into the fibrous structure of layer 1 and or layer 3, leaving areas of layer 1 and layer 3 intermittently in direct contact. This not the case where layer 2 contains fiber and binder, which effectively separates layer 1 from layer 3.

The fiber of layer 1, layer 3 and when present in layer 2 may be cellulosic fiber, synthetic fiber or a mixture thereof. A preferred embodiment uses cellulosic fiber. The fiber composition of the layers may be identical or different.

In a preferred embodiment of the material of this invention, the fiber and binder of a layer is from about 60 weight percent to about 95 weight percent fiber and from about 5 weight percent to about 40 weight percent binder, where the weight percentages are based on the total weight of fiber and binder in the layer.

The binder of layer 1, layer 3 and when present in layer 2 may be a synthetic binder fiber, a latex or a combination thereof. The binder composition of the layers may be identical or different. In one embodiment it is desirable that one or more layers contain a synthetic binder fiber in combination with a latex binder. In that case, the binder of the layer is a combination of from about 25 weight percent to about 75 weight percent synthetic binder fiber and from about 75 weight percent to about 25 weight percent latex where the weight percentages are based on the total weight of binder in the layer and the weight percent latex includes latex solids and fluid carrier. When a binder fiber, such as, for example, bicomponent fiber is used, it is generally mixed with fiber of the layer. When a latex binder is used, it may be applied to either or both of the surfaces of a layer.

The carbon dioxide gas generating composition of layer 2 contains a weak base and a weak acid or a salt which is convertible into an acid. Generally, the weak acid has a solubility of 0.5 g/100 g of water or greater at 30° C., and has a melting point of 30° C. or greater. Examples of acids are citric acid, tartaric acid, succinic acid, fumaric acid, maleic acid, adipic acid, malic acid, oxalic acid, malonic acid, glutaric acid, phthalic acid, metaphosphoric acid, or wherein the salt which is convertible into an acid is an alkali metal salt of citric acid, tartaric acid, succinic acid, fumaric acid, maleic acid, adipic acid, malic acid, oxalic acid, malonic acid, glutaric acid, phthalic acid, metaphosphoric acid or a mixture thereof. Examples of salts which are convertible into acids are aluminum sulfate, calcium phosphate, alum, a double salt of an alum, potassium aluminum sulfate, sodium dihydrogen phosphate, potassium citrate, sodium maleate, potassium tartrate, sodium fumarate.

Generally, the weak base contains anionic carbonate or hydrogen carbonate, and, generally, the base contains as a cation an alkali metal, an alkaline earth metal or a transition metal. Examples of bases suitable for use in the practice of this invention are lead carbonate, calcium carbonate, barium carbonate, strontium carbonate, magnesium carbonate, beryllium carbonate, lithium carbonate, sodium carbonate, potassium carbonate, rubidium carbonate, cesium carbonate, lead hydrogen carbonate, calcium hydrogen carbonate, barium hydrogen carbonate, strontium hydrogen carbonate, magnesium hydrogen carbonate, beryllium hydrogen carbonate, lithium hydrogen carbonate, sodium hydrogen carbonate, potassium hydrogen carbonate, rubidium hydrogen carbonate, cesium hydrogen carbonate, or a mixture thereof.

In a preferred composition the acid is citric acid and base is sodium hydrogen carbonate.

It is desirable that the ratio by weight of acid to base in the carbon dioxide gas generating composition is from about 10:1 to about 1:10, preferably, that the ratio by weight of acid to base in the carbon dioxide gas generating composition is from about 5:1 to about 1:5. It is desirable that the ratio of equivalents of acid to equivalents of base in the carbon dioxide gas generating composition is from about 5:1 to about 1:5, preferably, that the ratio of equivalent of acid to equivalents of base in the carbon dioxide gas generating composition is from about 3:2 to about 2:3

In another aspect of this invention, the latent carbon dioxide gas generating material further comprises a carrier having a basis weight of from about 10 gsm to about 40 gsm which is in contact with the outer surface of layer 1 or layer 3. The carrier may be a cellulosic tissue carrier or made of synthetic material, such as, for example, a polyolefin or polyester.

Desirably, the latent carbon dioxide gas generating material of this invention has a basis weight of from about 65 gsm to about 500 gsm. One desirable embodiment has a basis weight of from about 65 gsm to about 140 gsm, while an alternative desirable embodiment has a basis weight of from about 141 gsm to about 300 gsm, and another desirable embodiment has a basis weight of from about 301 gsm to about 500 gsm.

The carbon dioxide gas generating composition may be from about 3 weight percent to about 60 weight percent of the latent carbon dioxide gas generating material. In one embodiment, the carbon dioxide gas generating composition is from about 3 weight percent to about 20 weight percent based on the total weight of the material, while in another embodiment, the carbon dioxide gas generating composition is from about 21 weight percent to about 40 weight percent based on the total weight of the material, and in a further embodiment, the carbon dioxide gas generating composition is from about 41 weight percent to about 60 weight percent based on the total weight of the material.

In one embodiment of this invention, the carbon dioxide gas generating composition contains a hydrophilic material with a hygroscopicity of from about 80 weight percent to about 250 weight percent based on the weight of the hydrophilic material at 30° C. The hydrophilic material may be a saccharide or derivative thereof, polyhydric alcohol or derivative thereof, polyacrylamide or derivative thereof, polyelectrolyte or a water absorbing polymer. Examples of hydrophilic materials are erythrose, threose, arabinose, xylose, lyxose, glucose, fructose, mannose, galactose, sorbitol, gluconic acid, sucrose, lactose, maltose, dextrin, amylose and hydroxymethyl cellulose.

The carbon dioxide gas generating composition may contain a hydrophobic material, such as, for example, a wax, a fatty acid or a salt or ester of a fatty acid.

There are a number of manufacturing processes that can be used to produce the latent carbon dioxide gas generating material of this invention. For example, one manufacturing process is an airlaid process which is used to produce an airlaid web which is typically prepared by disintegrating or defiberizing a pulp sheet or sheets typically by a hammermill to provide substantially opened fibers. The opened fibers are then air conveyed to forming heads on the airlaid web forming machine. Several manufacturers make defiberized pulp sheet airlaid web forming machines including M & J Fibretech of Denmark and Dan-Web, also of Denmark. The forming heads can include rotating or agitated drums, generally in a race track configuration which serve to maintain fiber separation until the fibers are pulled by vacuum onto a foraminous condensing drum or foraminous forming conveyor. Other fibers, such as a synthetic thermoplastic fiber, or superabsorbent fiber can also be introduced to the forming head through a fiber dosing system which includes a fiber opening, a dosing unit and an air conveyor. Non-fibrous materials, such as, for example a carbon dioxide gas generating composition and various additives, such as, for example, a hydrophilic material such as a superabsorbent polymer (SAP) or a hydrophobic material in powder form, particulate or granules can also be added to the forming head by a dosing system.

Typically, the airlaid web is transferred from the condensing drum or forming conveyor to a calender or other densification stage to density the web, increase its strength and control web thickness. The fibers of the web are then bonded by application of a latex spray or foam addition system, followed by drying or curing. Alternatively, or additionally, any thermoplastic fiber present in the web can be softened or partially melted by application of heat to bond the fibers of the web. The bonded web can then be calendered a second time to increase strength or emboss the web with a design or pattern. If thermoplastic fibers are present, hot calendering can be employed to impart patterned bonding to the web. Water can be added to the web if necessary to maintain specified or desired moisture content, to minimize dusting and to reduce the buildup of static electricity.

The airlaid manufacturing system has the advantage that it is a continuous process which employs a series of unit operations to produce a unitary material. Alternatively, various elements of the material can be produced as individual components and then assembled in a converting operation.

The bulk fibers of the present invention may be natural, synthetic, or a mixture thereof In one embodiment, the fibers may be cellulose-based pulp fibers, one or more synthetic fibers, or a mixture thereof. Any cellulose fibers known in the art, including cellulose fibers of any natural origin, such as those derived from wood pulp, may be used in a cellulosic layer. Preferred cellulose fibers include, but are not limited to, digested fibers, such as kraft, prehydrolyzed kraft, soda, sulfite, chemi-thermal mechanical, and thermo-mechanical treated fibers, derived from softwood, hardwood or cotton linters. More preferred cellulose fibers include, but are not limited to, kraft digested fibers, including prehydrolyzed kraft digested fibers. Suitable for use in this invention are the cellulose fibers derived from softwoods, such as pines, firs, and spruces. Other suitable cellulose fibers include those derived from Esparto grass, bagasse, kemp, flax and other lignaceous and cellulosic fiber sources. Suitable cellulose fibers include, but are not limited to, bleached Kraft southern pine fibers sold under the trademark FOLEY FLUFFS®, Buckeye Technologies Inc., Memphis, Tenn. Synthetic fibers include for example polyester such as PET, nylon, polyethylene or polypropylene.

Also preferred is cotton linter pulp, chemically modified cellulose such as crosslinked cellulose fibers and highly purified cellulose fibers, such as Buckeye HPF each available from Buckeye Technologies Inc., Memphis, Tenn.

The fiber-containing layer may also include thermoplastic binding material, which may be blended with the cellulosic or synthetic fibers. Suitable thermoplastic binding material includes thermoplastic fibers, such as bicomponent thermoplastic fibers (bico). Preferred thermoplastic binding fibers provide enhanced adhesion for a wide range of materials, including synthetic and natural fibers, particles, and synthetic and natural carrier sheets. An exemplary thermoplastic bico fiber is Celbond Type 255 Bico fiber from KoSa, Charlotte, N.C.

Bicomponent fibers having a core and sheath are known in the art. Many varieties are used in the manufacture of nonwoven materials, particularly those produced by airlaid techniques. Various bicomponent fibers suitable for use in the present invention are disclosed in U.S. Pat. Nos. 5,372,885 and 5,456,982, both of which are hereby incorporated by reference in their entirety. Examples of bicomponent fiber manufacturers include KoSa (Salisbury, N.C.), Trevira (Bobingen, Germany) and ES Fiber Visions (Athens, Ga.).

Bicomponent fibers may incorporate a variety of polymers as their core and sheath components. Bicomponent fibers that have a PE (polyethylene) or modified PE sheath typically have a PET (polyethyleneterephthalate) or PP (polypropylene) core. In one embodiment, the bicomponent fiber has a core made of polyester and sheath made of polyethylene. The denier of the fiber preferably ranges from about 1.0 dpf to about 4.0 dpf, and more preferably from about 1.5 dpf to about 2.5 dpf The length of the fiber is preferably from about 3 mm to about 12 mm, more preferably from about 4.5 mm to about 7.5 mm.

Various geometries can be used for the bicomponent fiber of this invention, including concentric, eccentric, islands-in-the-sea, and side-by-side. The relative weight percentages of the core and sheath components of the total fiber may be varied.

The present invention may also include a latex binder. Preferred binders include but are not limited to ethyl vinyl acetate copolymer such as AirFlex 124 (Air Products, Allentown, Pa.) with 10% solids and 0.75% by weight Aerosol OT (Cytec Industries, West Paterson, N.J.), which is an anionic surfactant. Other classes of emulsion polymer binders such as styrene-butadiene and acrylic binders may also be used.

Various materials, structures and manufacturing processes useful in the practice of this invention are disclosed in U.S. Pat. Nos. 6,241,713; 6,353,148; 6,353,148; 6,171,441; 6,159,335; 5,695,486; 6,344,109; 5,068,079; 5,269,049; 5,693,162; 5,922,163; 6,007,653; and 6,355,079; and in U.S. patent applications with serial numbers and filing dates, Ser. No. 09/211,935 filed Dec. 15, 1998; Ser. No. 09/232,783 filed Jan. 19, 1999; Ser. No. 09/719,338 filed Jan. 17, 2001; Ser. No. 09/475,850 filed Dec. 30, 1999; Ser. No. 09/469,930 filed Dec. 21, 1999; Ser. No. 09/578,603 filed May 25, 2000; Ser. No. 05/593,409 filed Jun. 14, 2000; Ser. No. 09/325,764 filed Jun. 8, 1999 allowed; Ser. No. 09/774,248 filed Jan. 30, 2001; and Ser. No. 09/854,179 filed May 11, 2001, all of which are hereby incorporated by reference in their entirety.

EXAMPLES

Example 1

Handsheets were formed on a lab airlaid forming device in two layers. The pads were built on top of a Spunbond-Meltblown-Meltblown-Spunbond (SMMS) polypropylene hydrophobic carrier having a basis weight of 17 gsm, NW 58 from First Quality Nonwovens, Great Neck, N.Y.

Layer 1 was a blend of 55 gsm cellulose fluff, FOLEY FLUFFS®, Buckeye, Perry, Fla., and 9.7 gsm 2.0 dpf×6 mm bicomponent fiber with a polyester core and a polyethylene sheath, F55 from KoSa, Charlotte, N.C., which was deposited directly on the carrier. Then 5.6 gsm of a pre-mixed powder of sodium bicarbonate and acetylsalicylic acid from $CO_2$ Technologies, West Des Moines, Iowa, was added by hand. The powder had an 88:12 base:acid powder content ratio by weight. The carrier side was sprayed with 11 gsm of an ethylene vinyl acetate latex with 20 percent solids, EP-1188 from Air Products, Allentown Pa.

Layer 2 was a blend of 110 gsm cellulose fluff, FOLEY FLUFFS®, and 19.4 gsm bicomponent fiber, KoSa F55, 2.0 dpf×6 mm, which was deposited on top of the powder. The materials were pressed with shims at 5.08 mm (200 mils) thickness and 239.2 kPa (5000 psi) pressure with platens heated to 150° C. for 1 minute. The pads were then cured for 15 minutes at 145° C.

Example 2

Handsheets were formed as described in Example 1, except that 11.3 gsm of a pre-mixed powder of sodium bicarbonate and acetylsalicylic acid with an 88:12 base:acid powder content ratio by weight from $CO_2$ Technologies, was added by hand.

Example 3

Handsheets were formed as described in Example 1, except that 22.5 gsm of a pre-mixed powder of sodium bicarbonate and acetylsalicylic acid with an 88:12 base:acid powder content ratio by weight from $CO_2$ Technologies, was added by hand.

Example 4

Handsheets were formed as described in Example 1, except that 33.8 gsm of a pre-mixed powder of sodium bicarbonate and acetylsalicylic acid with an 88:12 base:acid powder content ratio by weight from $CO_2$ Technologies, was added by hand.

Examples 1-4 were submitted for a gas generation study. A graph of the outcome of that study appears as FIG. 1.

Example 5

Nonwoven material was made on a Dan-Web type pilot airlaid machine using three forming heads to deposit three layers on a Spunbond-Meltblown-Meltblown-Spunbond (SMMS) polypropylene hydrophobic carrier having a basis weight of 17 gsm, NW 58 from First Quality Nonwovens, Great Neck, N.Y.

Layer 1 was a blend of 29.2 gsm cellulose fluff, FOLEY FLUFFS® and 5.1 gsm of a 1.7 dtex×4 mm bicomponent fiber with a polypropylene core and a polyethylene sheath, AL-Adhesion-C, Fiber Visions Covington, Ga., was deposited on the carrier. This layer was sprayed with 5 gsm of Airflex 192, an ethylene vinyl acetate latex used at 15 percent solids, from Air Products, Allentown, Pa.

Layer 2 was a blend of 29.2 gsm of FOLEY FLUFFS®, 5.1 gsm Fiber Visions bicomponent fiber, AL-Adhesion-C, 1.7 dtex×4 mm, and 22.5 gsm of a blend of sodium bicarbonate from Church & Dwight, Princeton, N.J., and citric acid powders. The blend ratio of the powder was 88:12 sodium bicarbonate: citric acid by weight.

Layer 3 was a blend of 29.2 gsm FOLEY FLUFFS® and 5.1 gsm Fiber Visions bicomponent fiber, AL-Adhesion-C, 1.7 dtex×4 mm. This layer was sprayed with 2.5 gsm of Airflex 192, 15% solids. The material was then pressed to a target caliper of 2.74 mm.

Example 6

Nonwoven material was made as in Example 5, except that in Layer 1 the fiber blend contained 36.3 gsm of FOLEY FLUFFS® and 6.3 gsm of Fiber Visions bicomponent fiber, AL-Adhesion-C, Layer 2 used 36.3 gsm of FOLEY FLUFFS® and 6.3 gsm of Fiber Visions AL-Adhesion-C, and 22.5 gsm of the bicarbonate citric acid blend and Layer 3 used 36.3 gsm of FOLEY FLUFFS® and 6.3 gsm of Fiber Visions bicomponent fiber, AL-Adhesion-C. Samples were pressed to a target caliper of 3.16 mm.

Example 7

Nonwoven material was made as in Example 5, except that in Layer 1, the fiber blend contained 43.4 gsm of FOLEY FLUFFS® and 7.6 gsm of Fiber Visions bicomponent fiber, AL-Adhesion-C, Layer 2 used 43.6 gsm of FOLEY FLUFFS® and 7.6 gsm of Fiber Visions AL-Adhesion-C, and 22.5 gsm of the bicarbonate citric acid blend and Layer 3 used 43.4 gsm of FOLEY FLUFFS® and 7.6 gsm of Fiber Visions bicomponent fiber, AL-Adhesion-C. Samples were pressed to a target caliper of 3.61 mm.

Example 8

Nonwoven material was made as in Example 5, except that in Layer 1, the fiber blend contained 23.4 gsm of FOLEY FLUFFS® and 5.1 gsm of a 2.2 dtex×3 mm bicomponent fiber with a polyethyleneterephthalate core and a polyethylene sheath, Merge 1663 from Trevira, Frankfurt am Main, Germany, Layer 2 used 43.6 gsm of FOLEY FLUFFS® and 5.1 gsm Merge 1663, and 22.5 gsm of a bicarbonate citric acid blend with base to acid ratio 4:1 by weight and Layer 3 used 43.4 gsm of FOLEY FLUFFS® and 5.1 gsm Merge 1663. Samples were pressed to a target caliper of 2.74 mm. A sample of the material was activated with water and carbon dioxide gas was generated.

Example 9

Nonwoven material was made as in Example 8, except that in Layer 1 the fiber blend contained 26.7 gsm of FOLEY FLUFFS® and 7.8 gsm of Merge 1663, Layer 2 used 26.7 gsm of FOLEY FLUFFS® and 7.8 gsm Merge 1663, and 102 gsm of the bicarbonate citric acid blend and Layer 3 used 26.7 gsm of FOLEY FLUFFS® and 7.8 gsm Merge 1663. Samples were pressed to a target caliper of 2.8 mm. A sample of the material was activated with water and carbon dioxide gas was generated.

Example 10

Nonwoven material was made as in Example 8, except that in Layer 1, the fiber blend contained 40 gsm of FOLEY FLUFFS® and 9.4 gsm of Merge 1663, Layer 2 used 40 gsm of FOLEY FLUFFS® and 9.4 gsm Merge 1663, and 102 gsm of the bicarbonate citric acid blend and Layer 3 used 40 gsm of FOLEY FLUFFS® and 9.4 gsm Merge 1663. Samples were pressed to a target caliper of 3.3 mm. A sample of the material was activated with water and carbon dioxide gas was generated.

What is claimed is:

1. A latent carbon dioxide gas generating material comprising:
    (A) layer 1 containing fiber and a binder, having a basis weight of from about 25 gsm to about 100 gsm and having inner and outer surfaces,
    (B) layer 2 containing a carbon dioxide gas generating composition, having a basis weight of from about 5 gsm to about 300 gsm and having upper and lower surfaces, wherein layer 2 contains a carbon dioxide gas generating composition comprising a weak base and a weak acid, and
    (C) layer 3 containing fiber and a binder, having a basis weight of from about 25 gsm to about 100 gsm and having inner and outer surfaces,
    where the inner surface of layer 1 is in contact with the upper surface of layer 2 and the inner surface of layer 3 is in contact with the lower surface of layer 2.

2. The material of claim 1, further comprising a carrier having a basis weight of from about 10 gsm to about 40 gsm which is in contact with the outer surface of layer 1.

3. The material of claim 1, wherein the fiber of layer 1 is cellulosic fiber, synthetic fiber or a mixture thereof.

4. The material of claim 3, wherein the fiber of layer 1 is cellulosic fiber.

5. The material of claim 1, wherein the binder of layer 1 is a synthetic binder fiber, a latex or a combination thereof.

6. The material of claim 5, wherein the synthetic binder fiber of layer 1 is a bicomponent fiber.

7. The material of claim 1, wherein layer 1 contains from about 60 weight percent to about 95 weight percent fiber and from about 5 weight percent to about 40 weight percent binder, where the weight percentages are based on the total weight of fiber and binder in the layer.

8. The material of claim 1, wherein layer 1 contains a synthetic binder fiber in combination with a latex binder.

9. The material of claim 8, wherein the binder of layer 1 is a combination of from about 25 weight percent to about 75 weight percent synthetic binder fiber and from about 75 weight percent to about 25 weight percent latex where the weight percentages are based on the total weight of binder and the weight percent latex includes latex solids and fluid carrier.

10. The material of claim 1, wherein the weak acid has a solubility of 0.5 g/100 g of water or greater at 30° C., and has a melting point of 30° C. or greater.

11. The material of claim 1, wherein layer 2 contains a salt which is convertible into an acid.

12. The material of claim 10, wherein the acid is citric acid, tartaric acid, succinic acid, fumaric acid, maleic acid, adipic acid, malic acid, oxalic acid, malonic acid, glutaric acid, phthalic acid, metaphosphoric acid, or wherein the salt which is convertible into an acid is an alkali metal salt of citric acid, tartaric acid, succinic acid, fumaric acid, maleic acid, adipic acid, malic acid, oxalic acid, malonic acid, glutaric acid, phthalic acid, metaphosphoric acid or a mixture thereof.

13. The material of claim 1, wherein the weak base contains anionic carbonate or hydrogen carbonate.

14. The material of claim 13, wherein the base contains as a cation an alkali metal, an alkaline earth metal or a transition metal.

15. The material of claim 14, wherein the base is, lead carbonate, calcium carbonate, barium carbonate, strontium carbonate, magnesium carbonate, beryllium carbonate, lithium carbonate, sodium carbonate, potassium carbonate, rubidium carbonate, cesium carbonate, lead hydrogen carbonate, calcium hydrogen carbonate, barium hydrogen carbonate, strontium hydrogen carbonate, magnesium hydrogen carbonate, beryllium hydrogen carbonate, lithium hydrogen carbonate, sodium hydrogen carbonate, potassium hydrogen carbonate, rubidium hydrogen carbonate, cesium hydrogen carbonate, or a mixture thereof.

16. The material of claim 12, wherein the salt which is convertible into an acid is aluminum sulfate, calcium phosphate, alum, a double salt of an alum, potassium aluminum sulfate, sodium dihydrogen phosphate, potassium citrate, sodium maleate, potassium tartrate, sodium fumarate.

17. The material of claim 1, wherein the acid is citric acid and base is sodium hydrogen carbonate.

18. The material of claim 1, wherein layer 2 contains a carbon dioxide gas generating composition mixed with fiber and binder.

19. The material of claim 18, wherein the fiber of layer 2 is cellulosic fiber, synthetic fiber or a mixture thereof.

20. The material of claim 19, wherein the fiber of layer 2 is cellulosic fiber.

21. The material of claim 18, wherein the binder of layer 2 is a synthetic binder fiber, a latex or a combination thereof.

22. The material of claim 21, wherein the synthetic binder fiber of layer 2 is a bicomponent fiber.

23. The material of claim 1, wherein layer 2 contains fiber and binder which are from about 60 weight percent to about 95 weight percent fiber and from about 5 weight percent to about 40 weight percent binder, where the weight percentages are based on the total weight of the fiber and binder in the layer.

24. The material of claim 18, wherein layer 2 contains a synthetic binder fiber in combination with a latex binder.

25. The material of claim 23, wherein the binder of layer 2 is a combination of from about 25 weight percent to about 75 weight percent synthetic binder fiber and from about 75 weight percent to about 25 weight percent latex where the weight percentages are based on the total weight of binder and the weight percent latex includes latex solids and fluid carrier.

26. The material of claim 1, wherein the fiber of layer 3 is cellulosic fiber, synthetic fiber or a mixture thereof.

27. The material of claim 26, wherein the fiber of layer 3 is cellulosic fiber.

28. The material of claim 1, wherein the binder of layer 3 is a synthetic binder fiber, a latex or a combination thereof.

29. The material of claim 28, wherein the synthetic binder fiber of layer 3 is a bicomponent fiber.

30. The material of claim 26, wherein layer 3 contains from about 60 weight percent to about 95 weight percent fiber and from about 5 weight percent to about 40 weight percent binder, where the weight percentages are based on the total weight of the layer.

31. The material of claim 1, wherein layer 3 contains a synthetic binder fiber in combination with a latex binder.

32. The material of claim 31, wherein the binder of layer 3 is a combination of from about 25 weight percent to about 75 weight percent synthetic binder fiber and from about 75 weight percent to about 25 weight percent latex where the weight percentages are based on the total weight of binder and the weight percent latex includes latex solids and fluid carrier.

33. The material of claim 1, wherein the basis weight of the material is from about 65 gsm to about 500 gsm.

34. The material of claim 33, wherein the basis weight of the material is from about 65 gsm to about 140 gsm.

35. The material of claim 33, wherein the basis weight of the material is from about 141 gsm to about 300 gsm.

36. The material of claim 33, wherein the basis weight of the material is from about 301 gsm to about 500 gsm.

37. The material of claim 1, wherein the carbon dioxide gas generating composition is from about 3 weight percent to about 20 weight percent based on the total weight of the material.

38. The material of claim 1, wherein the carbon dioxide gas generating composition is from about 21 weight percent to about 40 weight percent based on the total weight of the material.

39. The material of claim 1, wherein the carbon dioxide gas generating composition is from about 41 weight percent to about 60 weight percent based on the total weight of the material.

40. The material of claim 1, wherein the ratio by weight of acid to base in the carbon dioxide gas generating composition is from about 10:1 to about 1:10.

41. The material of claim 40, wherein the ratio by weight of acid to base in the carbon dioxide gas generating composition is from about 5:1 to about 1:5.

42. The material of claim 1, wherein the ratio of equivalents of acid to equivalents of base in the carbon dioxide gas generating composition is from about 5:1 to about 1:5.

43. The material of claim 42, wherein the ratio of equivalent of acid to equivalents of base in the carbon dioxide gas generating composition is from about 3:2 to about 2:3.

44. The material of claim 1, wherein the carbon dioxide gas generating composition contains a hydrophilic material with a hygroscopicity of from about 80 weight percent to about 250 weight percent based on the weight of the hydrophilic material at 30° C.

45. The material of claim 44, wherein the hydrophilic material is a saccharide or derivative thereof, polyhydric alcohol or derivative thereof, polyacrylamide or derivative thereof, polyelectrolyte or a water absorbing polymer.

46. The material of claim 45, wherein the hydrophilic material is erythrose, threose, arabinose, xylose, lyxose, glucose, fructose, mannose, galactose, sorbitol, gluconic acid, sucrose, lactose, maltose, dextrin, amylose or hydroxymethyl cellulose.

47. The material of claim 1, wherein the carbon dioxide gas generating composition contains a hydrophobic material.

48. The material of claim 47, wherein the hydrophobic material is a wax, a fatty acid or a salt or ester of a fatty acid.

* * * * *